June 8, 1954  J. C. M. FROST  2,680,345
GAS TURBINE ENGINE INTAKE DEICING AND SCREEN
Filed Aug. 30, 1951  2 Sheets-Sheet 1
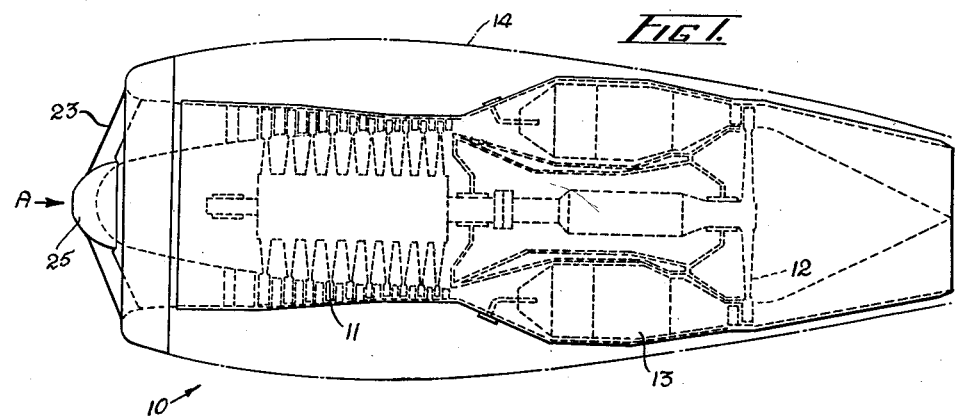
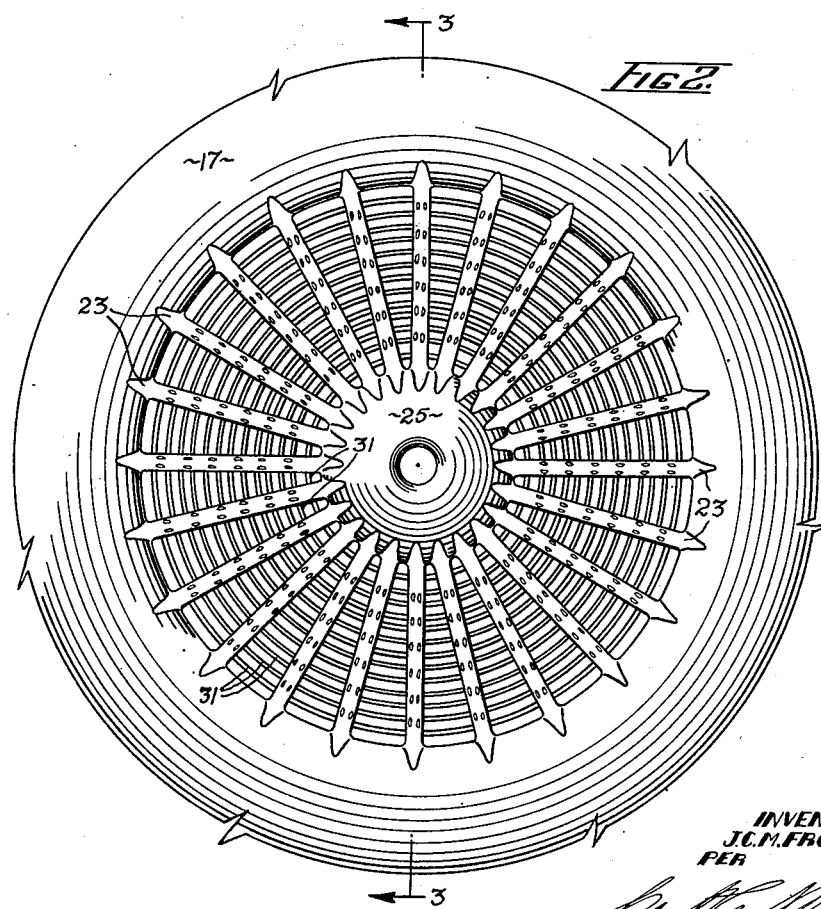
INVENTOR
J.C.M.FROST
PER
ATTORNEY June 8, 1954     J. C. M. FROST     2,680,345
GAS TURBINE ENGINE INTAKE DEICING AND SCREEN
Filed Aug. 30, 1951     2 Sheets-Sheet 2
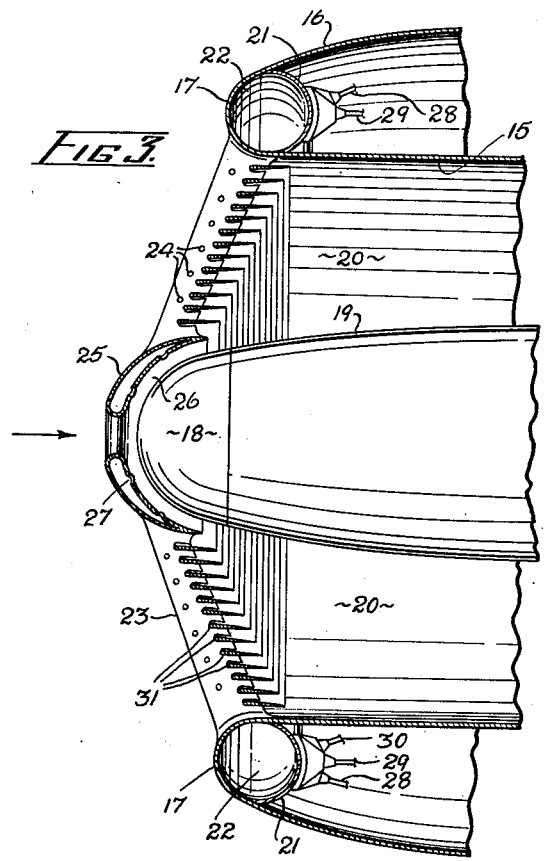
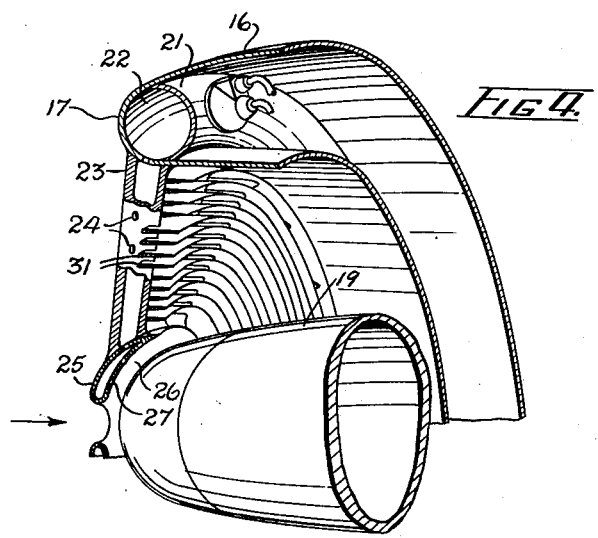
INVENTOR
J.C.M. FROST
PER
ATTORNEY Patented June 8, 1954

2,680,345

UNITED STATES PATENT OFFICE 2,680,345

GAS TURBINE ENGINE INTAKE DEICING AND SCREEN

John Carver Meadows Frost, Georgetown, Ontario, Canada, assignor to A. V. Roe Canada Limited, Malton, Ontario, Canada, a corporation Application August 30, 1951, Serial No. 244,383

3 Claims. (Cl. 60—39.09)

This invention concerns ice elimination systems for aircraft and more particularly it relates to the type of ice elimination systems which utilize charge heating.

Under certain atmospheric conditions, various surfaces of an aircraft are particularly susceptible to the formation of ice thereupon, and it has been found necessary to provide some means for removing ice so formed if the operation of the aircraft is not to be endangered. In the case of aircraft powered by gas turbine engines, the engine intakes must have special protection since the formation of large ice particles which might break off and be carried into the blading of the compressor cannot be tolerated; particularly is this true when a screen is provided in the engine intake to prevent entry of foreign matter since the disposition of such a screen increases the likelihood of ice formation thereupon.

One common method of dealing with this icing has been to utilize heated exhaust gases bled from the engine at a point downstream of the combustion system; although this method has the advantage of simplicity it reduces the engine's efficiency and demands extensive auxiliary insulated ducting for the hot gases.

It is the object of this invention, therefore, to provide an improved ice elimination system embodying its own combustion system.

It is a further object of the invention to provide such an ice elimination system for the intake of a gas turbine engine in conjunction with a guard screen which is heated thereby.

These and further objects will become apparent from examination of the following description and the accompanying drawings illustrating a preferred embodiment of the invention. In the drawings which form a part of the specification and in which like reference characters denote like parts throughout the various views, Fig. 1 is a diagrammatic side elevation of a gas turbine engine embodying an ice elimination system constructed in accordance with the invention;

Fig. 2 is an enlarged front elevation of the engine taken in the direction of arrow A in Fig. 1;

Fig. 3 is a cross-section on the line 3—3 in Fig. 2 and showing the details of the ice elimination system; and Fig. 4 is a perspective fragmentary view showing in more detail the relationship of the parts of the system.

Referring to the drawings, Fig. 1 shows a gas turbine engine 10 having a compressor 11, a turbine 12 and a combustion system 13, the whole being housed in a nacelle 14. The nacelle is substantially annular in cross section and is formed with an inner wall surface 15 and an outer wall surface 16 spaced therefrom, the two surfaces being conjoined at the forward end of the engine to form a circular leading edge 17. The nose bullet 18 is mounted coaxially on the forward end of the compressor 11 and its exterior surface 19, in conjunction with the inner surface 15 of the nacelle, defines the air intake 20 of the engine.

A trough-shaped annular wall 21 extending between the inner and outer walls 15 and 16 of the nacelle seals off the forward portion of the nacelle to provide an annular combustion chamber 22 conforming to the shape of the leading edge 17. A series of evenly spaced ports is disposed around the inner periphery of the combustion chamber 22 to communicate with a corresponding series of struts 23, the struts having apertures 24 spaced along their sides. The struts 23 extend radially inward and forward in a conical arrangement; they are fixed at their inner ends to an annular hollow hub or dished ring 25 which is spaced from the nose bullet 18 to provide an annular gap 26. The interior of the ring 25 is in communication with the individual struts 23 through a series of ports disposed around the surface 19 of the ring and registering with the struts. Further apertures 27 in the ring 25 lead from the interior of the ring to the gap 26. Fuel and air supply lines 28 and 29 are led into the combustion chamber 22 at points spaced symmetrically around the annular wall 21, and torch igniters 30 are provided in the duct at two of these points.

A series of concentric ring-shaped vanes 31 is fixed to the rearward edges of the struts 23 in good thermal contact therewith, the vanes being constructed of strip metal or other heat conducting material and being co-axially arranged at equally spaced radial intervals along the length of the struts to form a screen across the air intake 20 of the engine. Preferably each vane is notched to receive the rear portions of the struts 23.

When icing conditions are encountered while the engine is in operation and air is being drawn into the compressor 11 through the intake 20, a combustible mixture of fuel and air is supplied through the lines 28 and 29 to the combustion chamber 22, and the torch igniter 30 is switched on to ignite the mixture. The ensuing combustion heats the nacelle walls 15 and 16; the gaseous products of combustion are led through the struts 23 into the hub 25 and a portion of them is exhausted through the apertures 24 in the struts, the remaining portion being exhausted through the apertures 27 in the hub. The exhaust gases heat the struts in their passage therethrough, and the vanes 31 are heated by thermal conduction from the struts and by direct contact with the hot gases escaping through the apertures 24. The nose bullet 18 is heated directly by the gases escaping through the apertures 27 and by radiation from the heated surfaces adjacent the gap 26.

It will be readily apparent that with a construction such as described in the foregoing which heats the surfaces in the intake that are susceptible to the formation of ice (i. e. the front of the nacelle, the nose bullet, the struts and the vanes), the entry of comparatively large foreign particles into the engines is prevented.

The invention has been described with reference to an installation for preventing icing in the intake of a gas turbine engine, but it will be appreciated that it may be applied to other types of engines with equal advantage, or may even be utilized for de-icing the leading edges of wings or tail surfaces. Moreover, the actual construction of the system may be altered considerably; for example the combustion chamber 22 may be made as a separate unit spaced from the nacelle and transmitting heat thereto by radiation, the hub 25 may be dispensed with completely and the struts connected directly to the nose bullet at their inner ends, or the screen itself may be constructed as a grid with intersecting hollow tubes replacing the struts and vanes.

It will be understood, therefore, that the form of the invention herewith shown and described is to be taken as a preferred example of the same and that various changes to the shape, size and arrangement of the parts may be resorted to without departing from the spirit of the invention or the scope of the subjoined claims.

What I claim as my invention is:

1. In an aircraft power plant having an annular air intake defined by an annular body having an exposed leading edge surface surrounding the intake and susceptible to ice formation, and by a nose bullet located within the body in spaced relationship thereto, an ice elimination system comprising a combustion chamber having enclosing walls incorporating the said surface as a part of the wall of the combustion chamber itself, a hollow hub having its trailing wall surface forward of and in axially spaced relationship to the leading wall surface of the nose bullet to provide an open flow space between the hub and the nose bullet, hollow struts communicating with the chamber and extending across the intake to the hub to provide fluid flow passages between the chamber and the hub, means for supplying a mixture of fuel and air to the combustion chamber, means for igniting the said mixture, exhaust apertures in the struts for exhausting the products of combustion into the intake, and exhaust apertures in the trailing wall surface of the hub for exhausting the products of combustion into the flow space between the hub and the nose bullet.

2. An aircraft power plant as claimed in claim 1 in which the hollow struts extending across the intake have exhaust apertures for exhausting the products of combustion into the intake.

3. In an aircraft power plant having an annular air intake defined by an annular body having an exposed leading edge surface surrounding the intake and susceptible to ice formation and by a nose bullet located within the body in spaced relationship thereto, an ice elimination system comprising a combustion chamber having enclosing walls incorporating the said surface as a part of the wall of the combustion chamber itself, a hollow annular hub having a central opening and disposed forward of and in axially spaced relationship to the leading wall surface of the nose bullet to provide an open flow space between the trailing wall surface of the hub and the nose bullet, hollow struts communicating with the chamber and extending across the intake to the hub to provide fluid flow passages between the chamber and the hub, means for supplying a mixture of fuel and air to the combustion chamber, means for igniting the said mixture, exhaust apertures in the struts for exhausting the products of combustion into the intake, and exhaust apertures in the hub for exhausting the products of combustion into the flow space between the hub and the nose bullet.

References Cited in the file of this patent

UNITED STATES PATENTS

| Number | Name | Date |
| --- | --- | --- |
| 2,171,817 | Wagner et al. | Sept. 5, 1939 |
| 2,425,630 | McCollum | Aug. 12, 1947 |
| 2,630,965 | Greatrex et al. | Mar. 10, 1953 |

FOREIGN PATENTS

| Number | Country | Date |
| --- | --- | --- |
| 622,627 | Great Britain | May 4, 1949 |
| 637,598 | Great Britain | May 24, 1950 |